US010889928B2

(12) United States Patent
Fujimoto et al.

(10) Patent No.: US 10,889,928 B2
(45) Date of Patent: Jan. 12, 2021

(54) PRODUCTION MANAGEMENT SYSTEM, SEWING MACHINE, AND PRODUCTION MANAGEMENT DEVICE

(71) Applicant: JUKI CORPORATION, Tama (JP)

(72) Inventors: Mio Fujimoto, Tama (JP); Satomi Hara, Tama (JP)

(73) Assignee: JUKI CORPORATION, Tama (JP)

( * ) Notice: Subject to any disclaimer, the term of this patent is extended or adjusted under 35 U.S.C. 154(b) by 276 days.

(21) Appl. No.: 16/019,711

(22) Filed: Jun. 27, 2018

(65) Prior Publication Data

US 2019/0003094 A1      Jan. 3, 2019

(30) Foreign Application Priority Data

Jun. 30, 2017   (JP) ................................ 2017-128702

(51) Int. Cl.
*D05B 19/12*        (2006.01)
*G05B 19/18*        (2006.01)
*G05B 19/418*       (2006.01)

(52) U.S. Cl.
CPC ........... *D05B 19/12* (2013.01); *G05B 19/182* (2013.01); *G05B 19/4183* (2013.01); *G05B 2219/45195* (2013.01)

(58) Field of Classification Search
CPC ... D05B 9/00; D05B 9/02; D05B 9/06; D05B 9/12; G05B 2219/45195

USPC .................................................. 700/136–138
See application file for complete search history.

(56) References Cited

U.S. PATENT DOCUMENTS

| | | | | |
|---|---|---|---|---|
| 5,050,513 A | * | 9/1991 | Frankel | D05B 69/20 112/155 |
| 5,974,992 A | * | 11/1999 | Asano | D05C 5/06 112/102.5 |
| 6,295,481 B1 | * | 9/2001 | Price | D05B 19/12 112/470.05 |

FOREIGN PATENT DOCUMENTS

JP      2006-318365 A    11/2006

* cited by examiner

*Primary Examiner* — Nathan E Durham
(74) *Attorney, Agent, or Firm* — Faegre Drinker Biddle & Reath LLP (57) ABSTRACT

A production management system includes a sewing machine and a production management device. The sewing machine records chronological operation data. The production management device communicates with the sewing machine, and acquires and stores the operation data. The sewing machine includes a time acquisition unit that acquires a time at the time of the communication from a clock of the production management device at the time of the communication with the production management device and grants time information based on the time at the time of the communication to the operation data recorded at the time of the communication.

18 Claims, 11 Drawing Sheets

| ITEM | CONTENTS | |
|---|---|---|
| POWER-ON TIME | DATE | MARCH 27, 2017 |
| | TIME | 8:00 |
| NUMBER OF ONE-MINUTE DATA | XXXXXX | |
| ACTUAL RESULT DATA | ONE-MINUTE DATA | NUMBER OF STITCHES<br>ROTATING TIME OF SEWING MACHINE (SECOND)<br>THREAD CUTTING COUNT OR PATTERN SEWING COUNT |
| | ONE-MINUTE DATA | |
| | ONE-MINUTE DATA | |
| | ONE-MINUTE DATA | |
| | ... | |
| | ... | |
| | ... | |
| | ONE-MINUTE DATA | |

FIG. 4

| ITEM | | | CONTENTS |
|---|---|---|---|
| ACTUAL RESULT DATA | POWER-ON TIME | DATE | MARCH 27, 2017 |
| | | TIME | 8:00 |
| | POWER-OFF TIME | DATE | MARCH 27, 2017 |
| | | TIME | 45 MINUTES (ELAPSED TIME FROM START OF MEASUREMENT) |
| | ACTUAL RESULT DATA (FOR MAXIMUM 12 HOURS) | 15-MINUTE DATA | NUMBER OF STITCHES ROTATING TIME OF SEWING MACHINE (SECOND) THREAD CUTTING COUNT |
| | | 15-MINUTE DATA | |
| | | 15-MINUTE DATA | |
| | | 15-MINUTE DATA | |
| | | ... | |
| | | ... | |
| | | ... | |
| | | 15-MINUTE DATA | |
| ACTUAL RESULT DATA | | | |
| ACTUAL RESULT DATA | | | |
| ACTUAL RESULT DATA | | | |
| ... | | | |
| ... | | | |
| ... | | | |
| ACTUAL RESULT DATA | | | |

FIG. 11

PRODUCTION MANAGEMENT SYSTEM, SEWING MACHINE, AND PRODUCTION MANAGEMENT DEVICE

CROSS-REFERENCE TO RELATED APPLICATION

The present application claims priority from Japanese Patent Application No. 2017-128702 filed on Jun. 30, 2017, the entire content of which is incorporated herein by reference.

TECHNICAL FIELD

The present invention relates to a production management system, a sewing machine, and a production management device.

BACKGROUND ART

In sewing factories or the like, it is necessary to manage operation information of sewing machines to be used. Therefore, operation information is recorded for each sewing machine and the operation information is managed by collecting the operation information regarding each sewing machine (for example, see JP-A-2006-318365).

SUMMARY

Since various kinds of actuators or sensors are mounted on sewing machines and are controlled by control devices, operation information can be relatively easily acquired.

However, in the control of each unit of a sewing machine, time information is not necessary. Therefore, many sewing machines do not have clock functions.

When such a sewing machine is included as a management target, there is a problem that the operation information may not be arranged in association with a date or a time and production management may not be sufficiently performed.

An aspect of the invention is to provide a production management system, a sewing machine, and a production management device capable of performing management by associating operation information with time information and includes at least one of features of the following (1) to (8).

(1) A production management system includes a sewing machine and a production management device. The sewing machine records chronological operation data. The production management device communicates with the sewing machine, and acquires and stores the operation data. The sewing machine includes a time acquisition unit that acquires a time at the time of the communication from a clock of the production management device at the time of the communication with the production management device and grants time information based on the time at the time of the communication to the operation data recorded at the time of the communication.

(2) The production management system according to (1), the production management device includes an accumulation processing unit that adds time information indicating a continuation time of a time indicated by time information of operation data stored in advance to newly acquired operation data when the operation data newly acquired from the sewing machine does not include the time information.

(3) The production management system according to (1) or (2), the sewing machine includes a first record processing unit that accumulates record data for each first period and generates the operation data, and a second record processing unit that converts the plurality of pieces of record data accumulated for each first period into record data for each second period longer than the first period.

(4) The production management system according to any one of (1) to (3), the production management device acquires the operation data from a plurality of the sewing machines, and the production management system further comprise a display control unit that displays presence or absence of the operation data as a list for each plurality of dates for each of the plurality of sewing machines.

(5) The production management system according to any one of (1) to (4), the sewing machine and the production management device transmit and receive the operation data through short-range wireless communication.

(6) The production management system according to any one of (1) to (5), the sewing machine is a sewing machine that does not include a clock for acquiring a current time.

(7) A sewing machine recording chronological operation data and communicating with a production management device that acquires and stores the operation data, the sewing machine includes a time acquisition unit that acquires a time at the time of the communication from a clock of the production management device at the time of the communication with the production management device and grants time information based on the time at the time of the communication to the operation data recorded at the time of the communication.

(8) A production management device acquiring operation data from a sewing machine recording chronological operation data, the production management device includes an accumulation processing unit that adds time information indicating a continuation time of a time indicated by time information of operation data stored in advance to newly acquired operation data when the operation data newly acquired from the sewing machine does not include the time information.

According to the production management system described above, even when a sewing machine including no clock is included in a production management system, time information can be added to operation data. Thus, it is possible to sufficiently compare production management, a progress, or an operation rate based on operation information more accurately.

BRIEF DESCRIPTION OF THE DRAWING

FIGS. 5A to 5C are explanatory diagrams illustrating an accumulation process for operation data.

DETAILED DESCRIPTION

[Overall Configuration of Production Management System]

Figure 1:
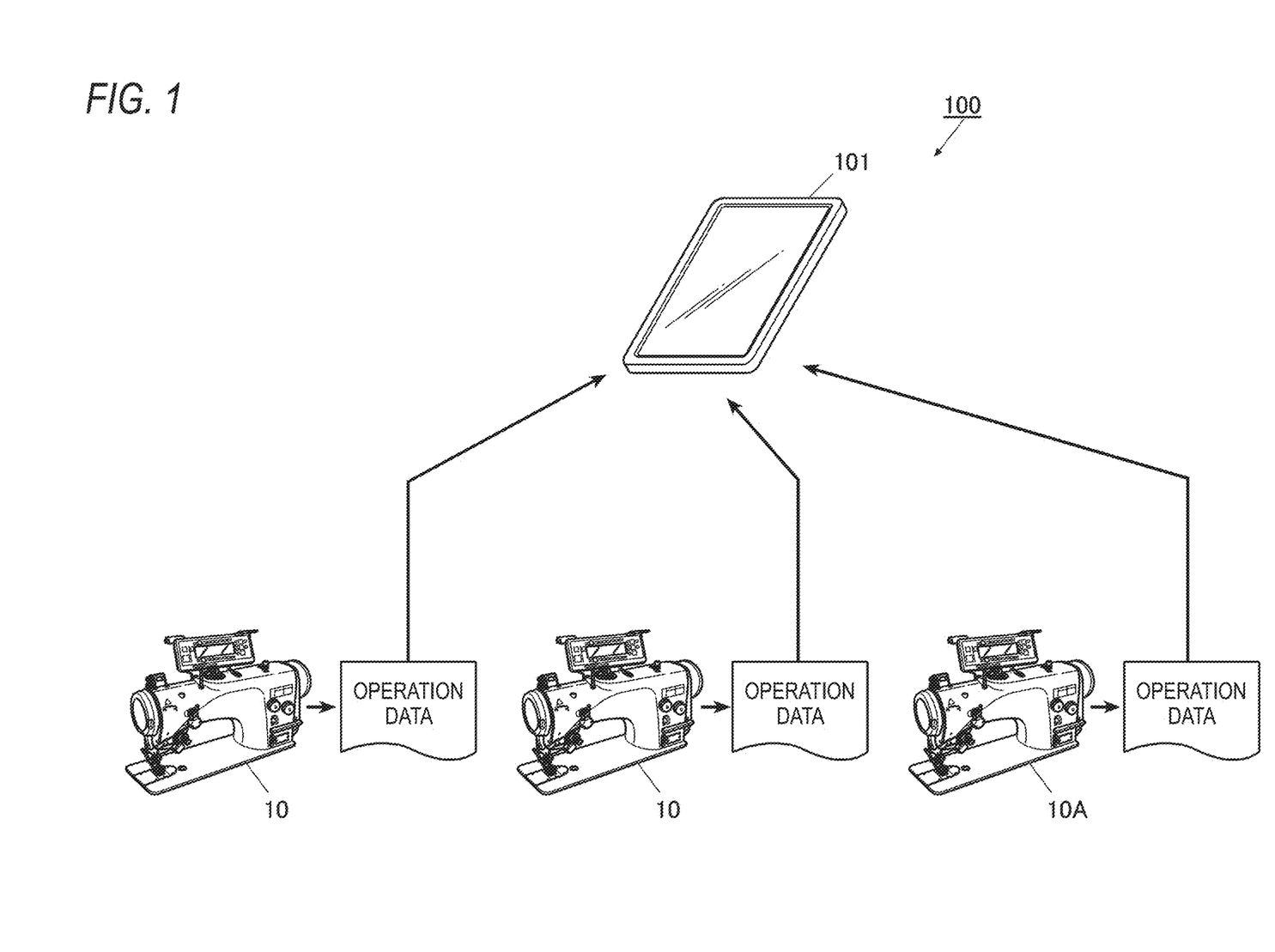
FIG. 1 is a block diagram illustrating an overall configuration of a production management system.

Hereinafter, a production management system 100 according to an embodiment of the invention will be described with reference to FIGS. 1 to 11. FIG. 1 is a block diagram illustrating an overall configuration of the production management system 100.

As illustrated in FIG. 1, the production management system 100 includes a plurality of sewing machines 10 and 10A which are management targets and a production management device 101 that collects a plurality of pieces of operation data acquired from the sewing machines 10 and 10A.

The production management device 101 is specifically configured with, for example, a table terminal containing a computer.

The production management device 101 collects operation data from the sewing machines 10 and 10A using near field communication (NFC) which is a short-range wireless communication technology.

[Sewing Machine]

Figure 2:
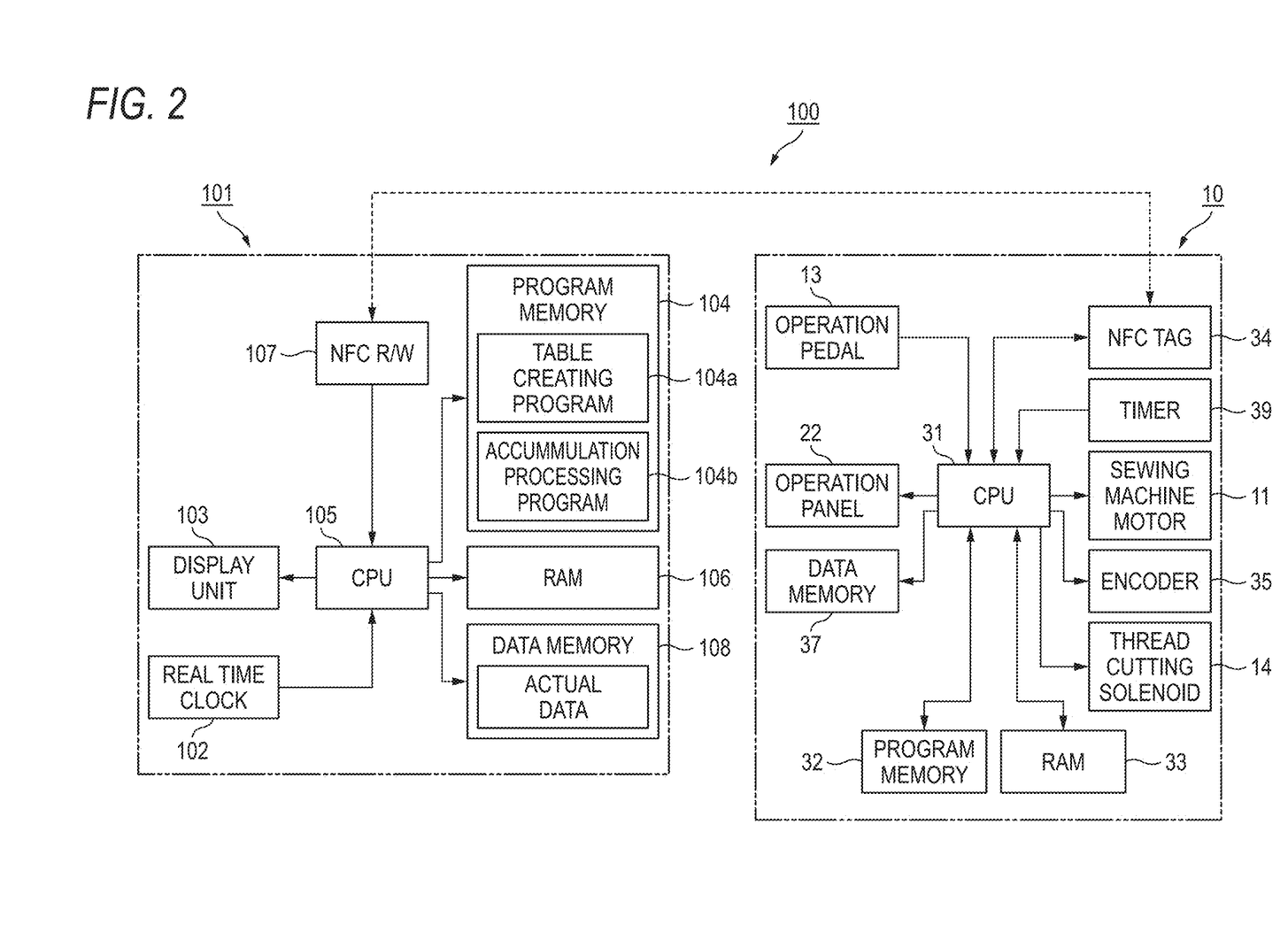
FIG. 2 is a block diagram illustrating an overall configuration of a production management system including a sewing machine.

FIG. 2 is a block diagram illustrating an overall configuration of a production management system 100 including the sewing machine 10.

The sewing machine 10 includes a sewing machine motor 11 that serves as a driving source for sewing, a knife driving solenoid 14 that drives a thread cutting knife that cuts a sewing thread, an operation pedal 13 that performs an input operation for a sewing speed and thread cutting, an operation panel 22 that can perform predetermined screen display and various kinds of inputs, a program memory 32 that stores programs executing various processes to be described below, a CPU 31 that executes the various programs, a RAM 33 that temporarily stores data regarding processes by the CPU 31, an NFC tag 34 that serves as a short-range wireless communication device, an encoder 35 that measures the number of a top shaft rotations by the sewing machine motor 11 to measures the number of stitches, and a nonvolatile data memory 37 such as a flash memory, an EPROM, or an EEPROM.

The sewing machine 10 is a sewing machine that includes no clock (real time clock) that acquires a current time and the sewing machine 10A is a sewing machine that includes a real time clock. The sewing machine 10A has the same configurations as the sewing machine 10 except that the real time clock is included, and therefore is not illustrated in FIG. 2.

In the sewing machine 10, a rotation speed (sewing speed) of the sewing machine motor 11 is controlled through a pre-treading operation on the operation pedal 13 in accordance with an amount of treading and the knife driving solenoid 14 is driven through a post-treading operation to perform a thread cutting operation.

The NFC tag 34 is a wireless communication device that transmits operation data of the sewing machine 10 to be described below to the production management device 101.

When an NFC reader/writer 107 included in the production management device 101 approaches, the NFC tag 34 detects a signal and transmits the operation data to the NFC reader/writer 107.

[Sewing Machine: Operation Data Generation Process]

The CPU 31 of the sewing machine 10 performs sewing operation control and an operation data generation process according to an operation on the operation pedal 13.

As described above, the sewing machine 10 includes no real time clock. However, a timer 39 is included together with the CPU 31, and thus the CPU 31 can measure and record an elapsed time from power-on to power-off of a main power supply of the sewing machine 10.

Here, an operation data generation process performed by the CPU 31 will be described.

The CPU 31 functions as a first record processing unit that accumulates record data for each first period and generates operation data from power-on to power-off of the main power supply.

The first period is 1 minute. The CPU 31 counts the "number of stitches" for 1 minute, a "rotating time of sewing machine motor," and the "number of thread cuttings" as the record data.

The "number of stitches" can be acquired from the number of rotations of the sewing machine motor 11 by the encoder 35.

The "rotation time of sewing machine motor" can be acquired by counting a driving time of the sewing machine motor 11 for 1 minute.

The "number of thread cuttings" is parameter for estimating the number of times of sewing and can be acquired by counting the number of inputs of thread cutting from the operation pedal 13.

When the sewing machine 10 is a sewing machine that performs sewing in accordance with sewing pattern data, the "number of times sewing of a sewing pattern is completed" in sewing is counted instead of the "number of thread cuttings." The number of times of sewing can be estimated form the number of times sewing of the sewing pattern is completed in sewing.

Figure 3:
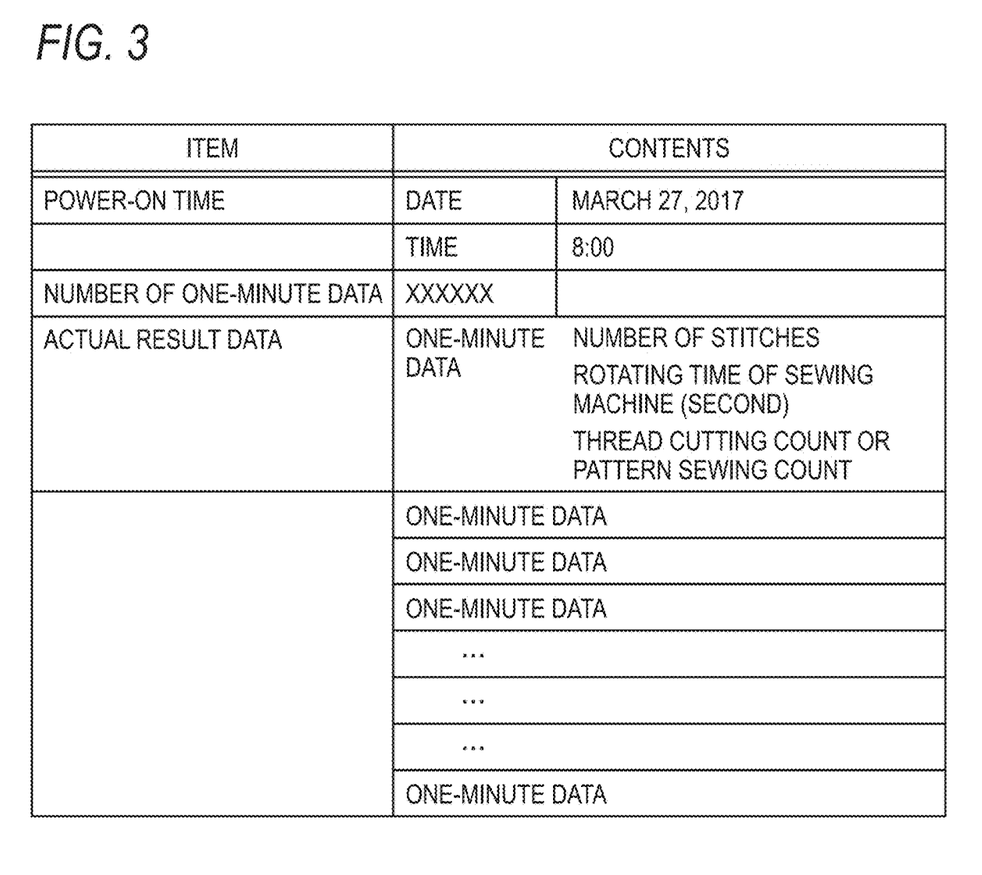
FIG. 3 is an explanatory diagram illustrating record content of operation data.

FIG. 3 is an explanatory diagram illustrating record content of operation data. In FIG. 3, record data indicating the "number of stitches," the "rotating time of sewing machine motor," and the "number of thread cuttings" for each minute is referred to as "1-minute data" for convenience.

As illustrated, the operation data generated through a process by the CPU 31 serving as a first record processing unit includes a power-on time of the main power supply, the number of pieces of record data, and record data recorded in sequence for each minute.

As the power-on time of the main power supply of the operation data, a power-on time indicated by the real time clock is recorded in the case of the sewing machine 10A including the real time clock. However, in the case of the sewing machine 10 that includes no real time clock, data indicating blank is recorded without recording the power-on time.

The number of pieces of record data is counted up when the record data is accumulated for each minute.

The record data for each minute is accumulated in sequence at each acquisition for each minute. The record data for each minute is accumulated until the main power supply of the sewing machine 10 is powered off.

Further, the CPU 31 functions as a second record processing unit that converts the record data illustrated in FIG. 3 into record data for each second period (15 minutes) longer than the first period (1 minute) to generate new operation data when the main power supply is powered off.

At this time, the CPU 31 accumulates the operation data generated through the process by the first record processing unit in the RAM 33. The new operation data generated through a process by the second record processing unit is stored in the nonvolatile data memory 37.

In the following description, the operation data generated through the process by the first record processing unit is referred to as "uncompressed operation data" and the operation data generated through the process by the second record processing unit is referred to as "compressed operation data,"

Figure 4:
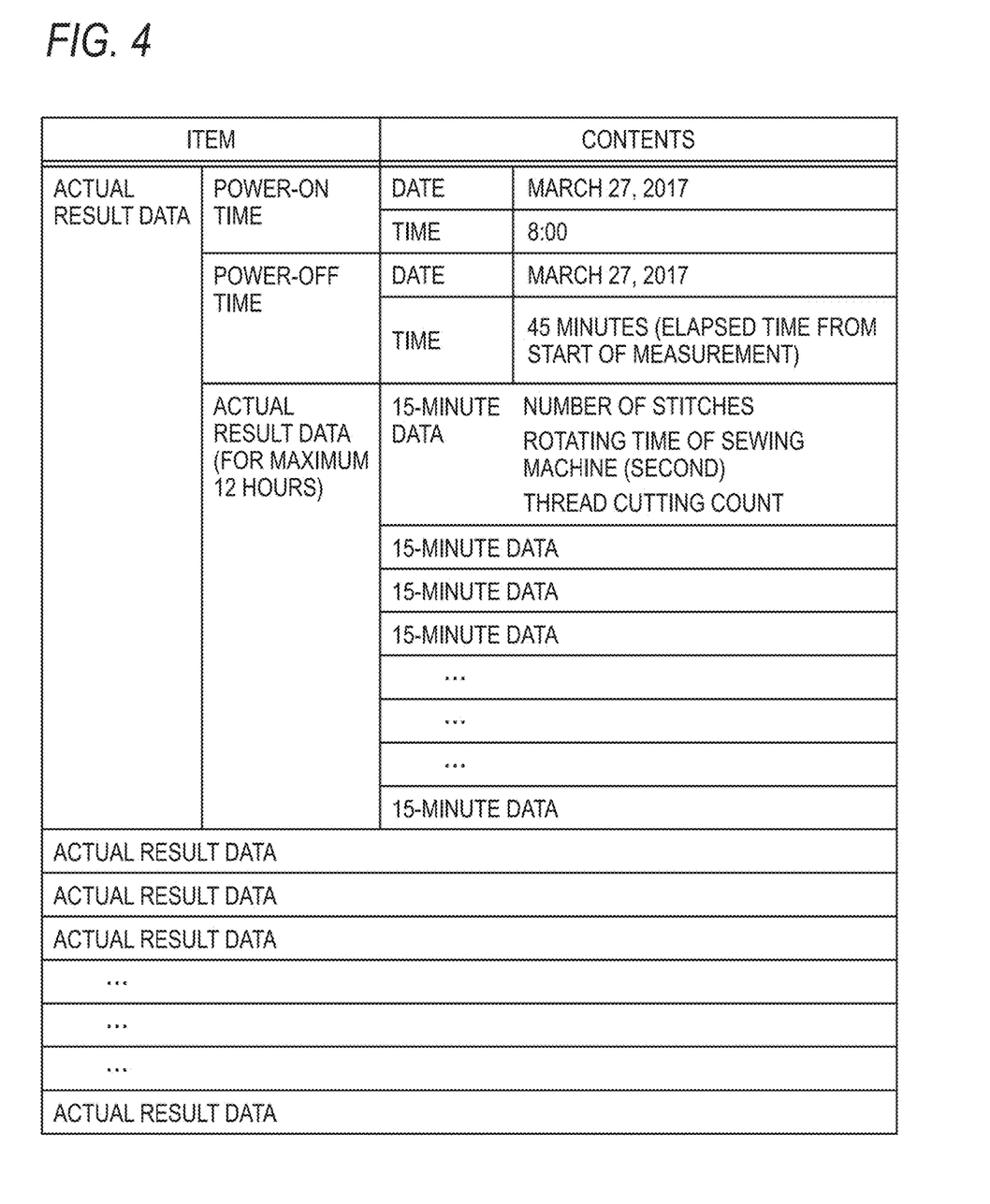
FIG. 4 is an explanatory diagram illustrating record content of compressed operation data.

FIG. 4 is an explanatory diagram illustrating record content of the compressed operation data.

The compressed operation data includes a power-on time of the main power supply, a power-off time of the main power supply, and record data for every 15 minutes obtained by compiling record data for each minute recorded in sequence×15. In FIG. 4, the record data compiled for every 15 minutes is referred to as "15-minute data" for convenience.

As the power-on time and the power-off time of the main power supply of the compressed operation data, a time indicated by the real time clock is recorded in the case of the sewing machine 10A including the real time clock and data indicating blank is recorded without recording a time in the case of the sewing machine 10 that includes no real time clock.

The record data compiled for every 15 minutes is calculated by segmenting the accumulated record data for each minute into 15 pieces of record data from the beginning record data and summing the "number of stitches," the "rotating time of sewing machine motor 11," and the "number of thread cuttings" for every 15 pieces of record data.

In this way, a data capacity can be considerably compressed by converting the 15 pieces of record data for each minute into 1 piece of record data for every 15 minutes.

The record data at the end of the accumulated record data for each minute is a fraction and is less than 15 pieces of record data in some cases. Even in this case, the record data for every 15 minutes is set by summing the record data for each minute which is a fraction.

The compressed operation data is set as one piece of data from power-on to power-off of the main power supply of one time. At the time of power-on to power-off of the main power supply, the compressed operation data is recorded in sequence in the data memory 37.

A ring buffer structure is adopted as a storage region of the compressed operation data in the data memory 37. When a plurality of pieces of compressed operation data are accumulated and exceed a given memory capacity, the operation data is overwritten and erased from the old compressed operation data.

[Sewing Machine: Acquiring Time of Operation Data]

The CPU 31 of the sewing machine 10 functions as a time acquisition unit that acquires a time at the time of communication from the real time clock 102 of the production management device 101 at the time of communication with the production management device 101 and grants time information based on the time at the time of the communication to the operation data recorded at the time of the communication.

That is, the sewing machine 10 that includes no real time clock may not record a power-on time of the main power supply of the operation data illustrated in FIG. 3, but an elapsed time from the power-on of the main power supply of the sewing machine 10 is measured by the timer 39.

Accordingly, at the time of communication with the production management device 101 from the power-on to the power-off of the main power supply, the CPU 31 of the sewing machine 10 acquires information indicating a time at the time of the communication from the production management device 101.

Then, by tracking back from the time at the time of communication acquired from the production management device 101 by an time elapsed from the power-on of the main power supply of the sewing machine 10, it is possible to obtain a power-on time of the main power supply of the sewing machine 10. The CPU 31 records the power-on time of the main power supply obtained through this calculation as a power-on time of the main power supply of the operation data illustrated in FIG. 3.

When communication with the production management device 101 is performed to acquire time information from the power-on to the power-off of the main power supply, a power-on time of the main power supply and a power-off time obtained from the power-on time at the time of powering off the main power supply can be recorded in the compressed operation data of FIG. 4.

In the sewing machine 10, a power-on time and a power-off time of the main power supply can be recorded when communication with the production management device 101 is performed from power-on and power-off of the main power supply to acquire time information. When the communication with the production management device 101 is not performed from the power-on to the power-off of the main power supply, the data remains blank.

[Production Management Device]

The production management device 101 includes a touch panel type display unit 103 that can perform screen display and an input operation, a program memory 104 that stores various programs executing various processes to be described below, a CPU 105 that executes various programs, a RAM 106 that serves as a work area of various kinds of data regarding processes of the CPU 105, an NFC reader/writer 107 that communicates with the NFC tags 34 of the sewing machines 10 and 10A, a nonvolatile data memory 108 such as a flash memory, an EPROM, or an EEPROM serving as a storage unit that stores the compressed operation data received from the sewing machines 10 and 10A via the NFC reader/writer 107, and a real time clock 102 that acquires current time information.

When the NFC reader/writer 107 transmits detection signals which can be received within a distance of within several centimeters or tens of centimeters to the NFC tags 34 of the sewing machines 10 and 10A and the NFC tags 34 receive the detection signals to establish communication, a current time at the time of the communication is transmitted to the sewing machine 10 and compressed operation data accumulated in the data memories 37 of the sewing machines 10 and 10A are received.

The program memory 104 stores an accumulation processing program 104b which is executed when the compressed operation data is received and a table creating program 104a which is executed based on the operation data processed by the accumulation processing program 104b.

The program memory 104 is a rewritable nonvolatile memory. The production management device 101 includes a communication interface (not illustrated) that performs communication with an external network so that a program to be recorded on the program memory 104 can be installed or deleted.

[Operation Data Accumulation Process]

An operation data accumulation process performed by the CPU 105 based on the accumulation processing program 104*b* will be described with reference to FIG. 5.

The production management device 101 manages the operation data for each of the sewing machines 10 and 10A. When the compressed operation data is newly received from the sewing machines 10 and 10A, record data for every 15 minutes in the newly compressed operation data is added to be chronologically connected to the operation data which has already been recorded in the data memory 108.

Here, compressed operation data including the time information is referred to as "defined operation data" and compressed operation data including no time information is referred to as "undefined operation data."

In the data memory 108, the undefined operation data including no time information is not recorded and only the defined operation data including time information is recorded.

The compressed operation data received from the sewing machine 10A is defined operation data normally including time information.

Accordingly, when the compressed operation data is received from the sewing machine 10A, a process applied to the operation data in the data memory 108 is performed so that the record data for every 15 minutes included in the compressed operation data is arranged chronologically.

On the other hand, the compressed operation data received from the sewing machine 10 is defined operation data including time information is some cases and is undefined operation data including no time information in some cases.

In the case of the defined operation data including time information, a process applied to the operation data in the data memory 108 is performed so that the record data for every 15 minutes included in the compressed operation data is arranged chronologically, like the case of the operation data of the sewing machine 10A.

On the other hand, when the compressed operation data which does not communicate with the production management device 101 from power-on to power-off of the main power supply of the sewing machine, the undefined operation data including no time information and the record data for every 15 minutes included in the operation data may not be added to the defined operation data in the data memory 108 without change.

Accordingly, when the newly acquired operation data is not included in the time information, the CPU 105 performs an accumulation process of adding the time information which is a continuation time of a time indicated by the time information of the stored defined operation data to the undefined operation data.

Figure 5A:
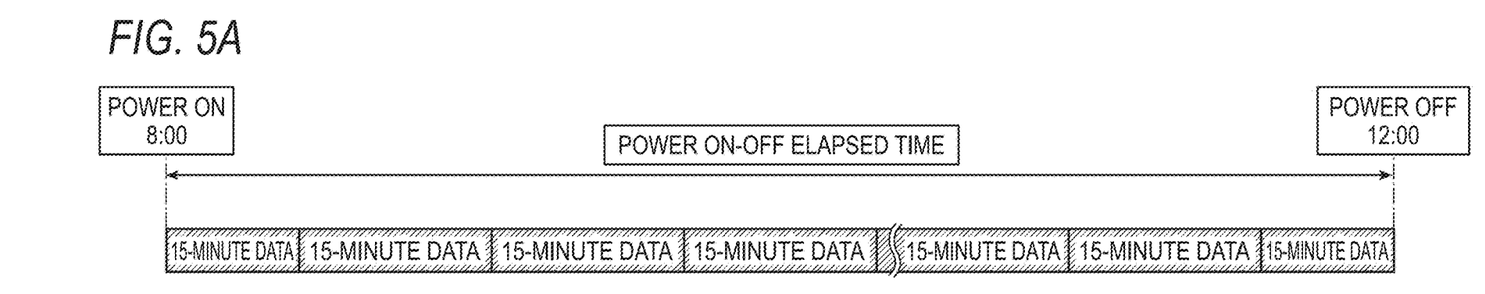
FIG. 5A is a diagram illustrating defined operation data including time information in a data memory.
Figure 5B:
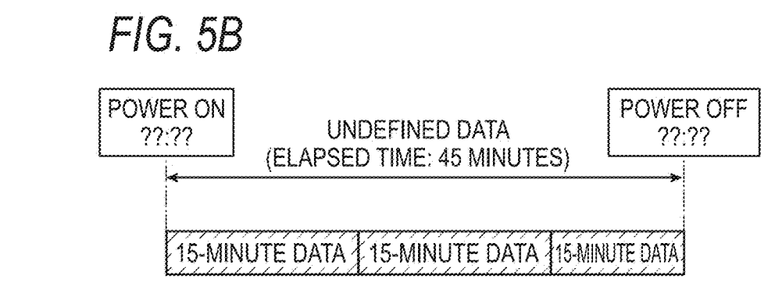
FIG. 5B is a diagram illustrating undefined operation data not including newly received time information.

Specifically, as illustrated in FIG. 5A, the CPU 105 performs the following process when the defined operation data including time information indicating a time from 8:00 to 12:00 is recorded in the data memory 108 and the undefined operation data including no time information, as illustrated in FIG. 5B, is newly received from the sewing machine 10.

Figure 5C:
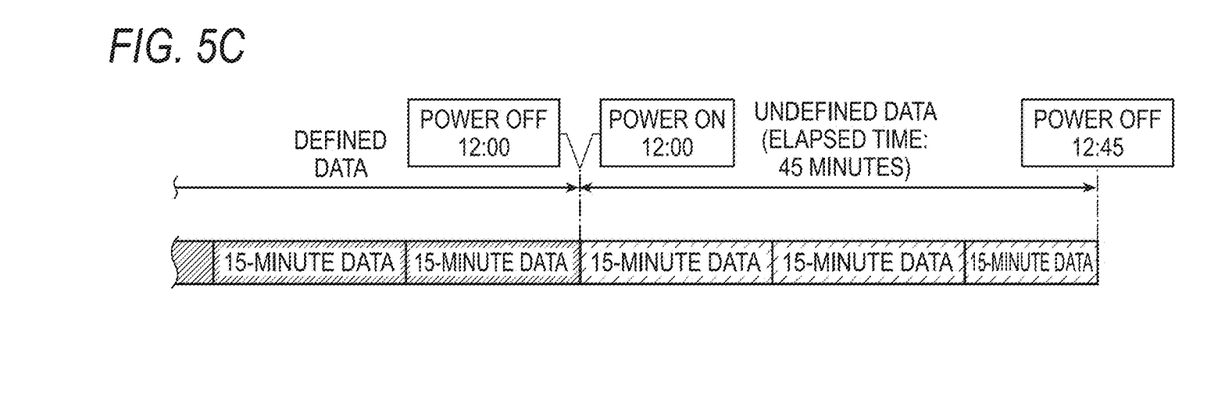
FIG. 5C is a diagram illustrating undefined operation data to which time information of the defined operation data is granted.

When the undefined operation data from the sewing machine 10 include record data with a length of 45 minutes, the CPU 105 grants time information from 12:00 to 12:45 to the undefined operation data, as illustrated in FIG. 5C, since a time at the end of the time information of the defined operation data in the data memory 108 is 12:00.

In this way, even the undefined operation data can be recorded as the defined operation data in the data memory 108.

In practice, date information is also included in the time information of the defined operation data and date information is also included in time information to be granted to the undefined operation data.

[Table Creating Process of Operation Data]

Next, a table creating process performed by the CPU 105 based on the table creating program 104*a* will be described with reference to FIGS. 6 to 10. In the table creating process, a plurality of kinds of tables are performed based on the operation data collected from the sewing machines 10 and 10A. Various tables will be described with reference to display examples of the tables to be created.

Figure 6:
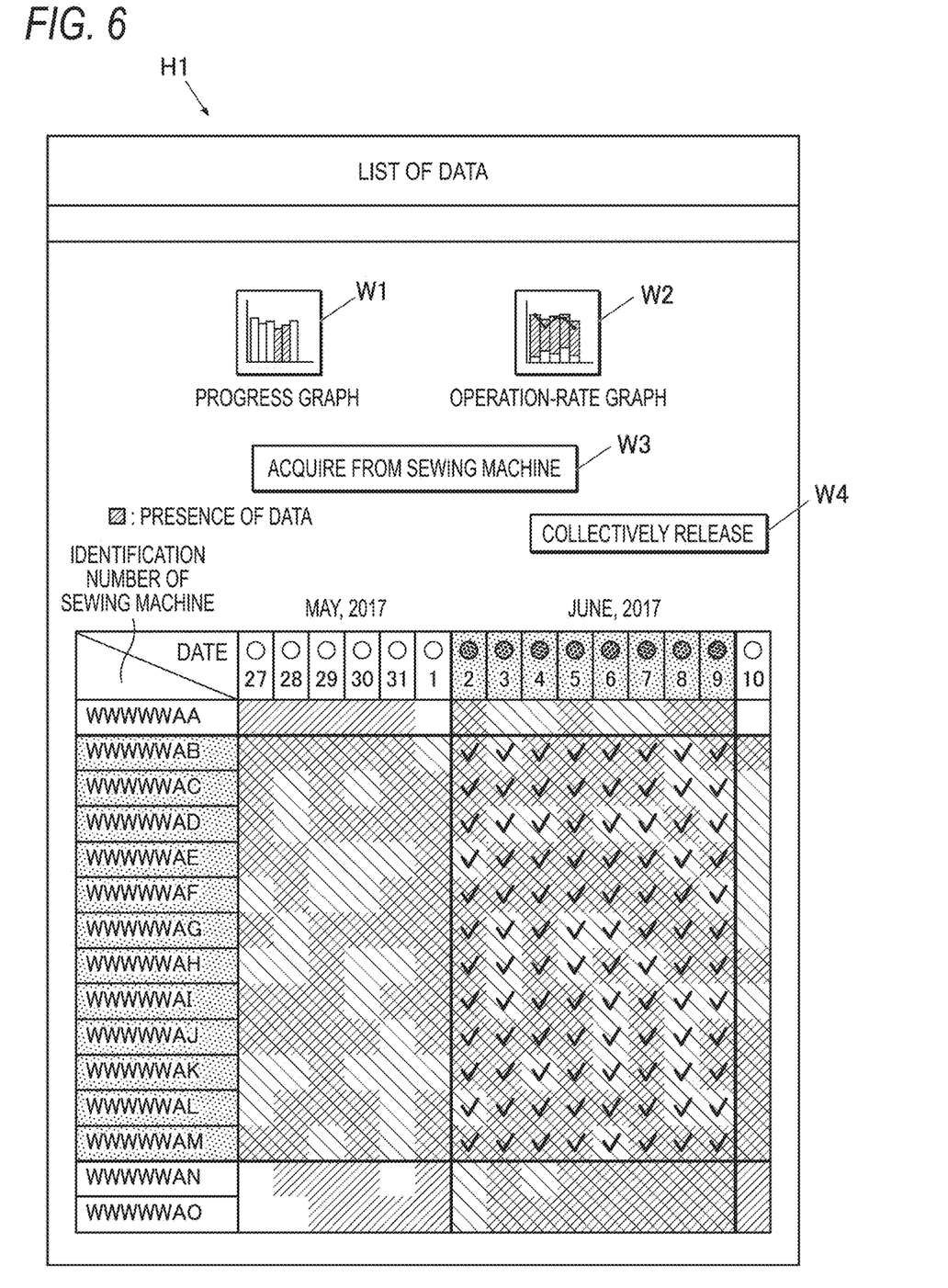
FIG. 6 is a diagram illustrating a display screen of a data list table.

FIG. 6 illustrates a display screen H1 of a list table in which presence or absence of the operation data on each of a plurality of certain dates is displayed as a list on the display unit 103 in each of the sewing machines 10 and 10A. The CPU 105 functions as a "display control unit" by performing a process of displaying a data list table.

In the data list table, identification signs of the sewing machines 10 and 10A belonging to the production management system 100 are displayed side by side along a column and dates of the operation data are displayed side by side along a row. Presence or absence of color display of a box corresponding to a date of each of the sewing machines 10 and 10A indicates presence or absence of the operation data.

On the display screen H1 of the data list, display switches W1 and W2 for switching and displaying a progress graph of a sewing work to be described below and an operation-rate graph of a sewing machine are displayed. By selecting these switches using a touch panel function, it is possible to perform display switching.

The display screen H1 of the data list is set as a selection screen for selecting target sewing machines 10 and 10A and target dates when various tables are displayed. That is, by selecting a column of a list of the sewing machines or designating and inputting a range of the list of the sewing machines using the touch panel function, it is possible to select one or a plurality of sewing machines 10 and 10A. By selecting a row of a list of dates or designating and inputting a range of the list of the dates, it is possible to select one or a plurality of dates. The selected range of the sewing machines and the selected range of the dates are shaded and displayed, and boxes in a display target range of the graph determined through the selection are marked to indicate completion of the selection.

A switch W3 in the display screen H1 of the data list is a switch for acquiring the compressed operation data from each of the sewing machines 10 and 10A.

A switch W4 is a switch for releasing all of the display target range of the selected graph.

Figure 7:
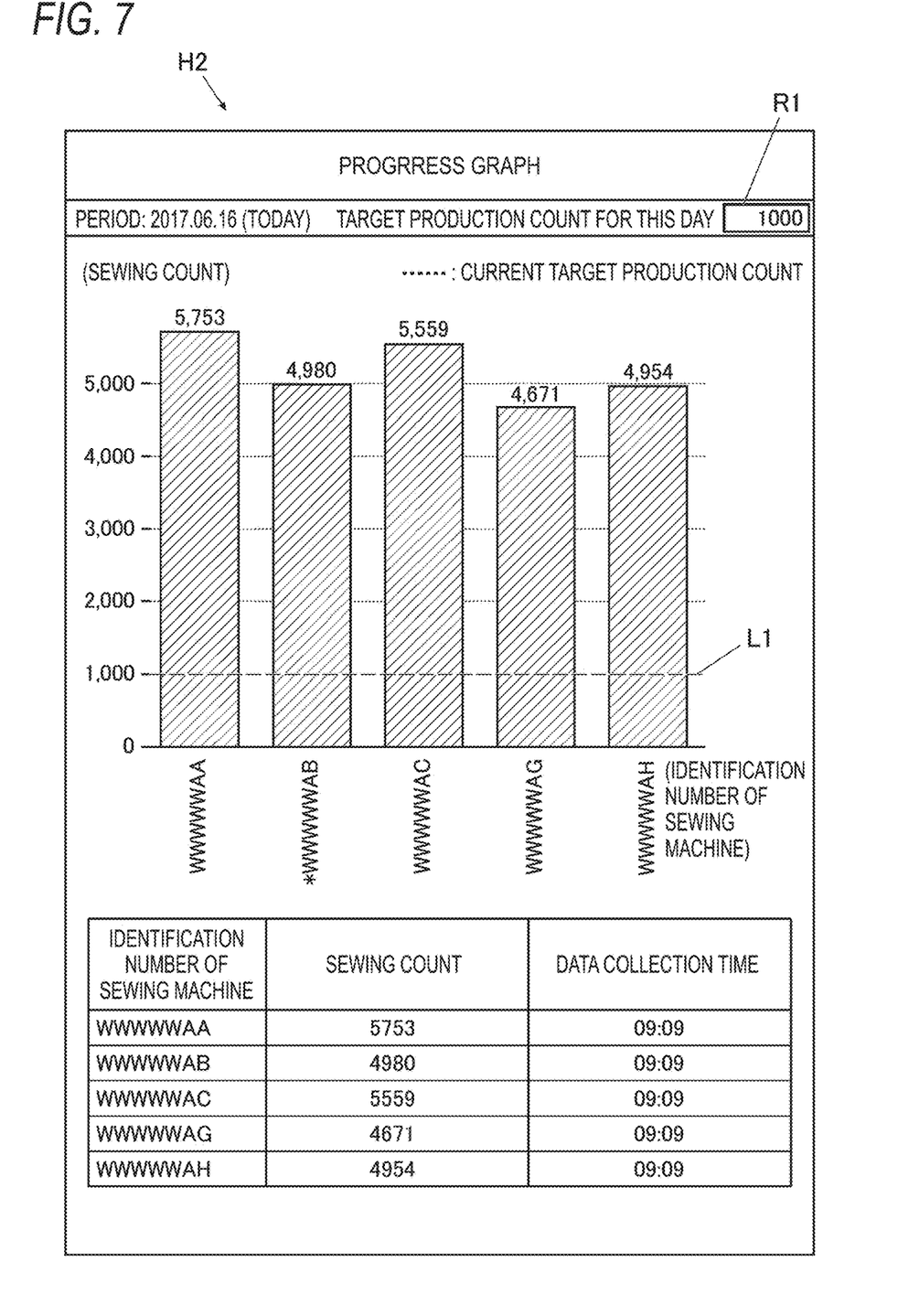
FIG. 7 is a diagram illustrating a display screen of a progress graph.

FIG. 7 illustrates a display screen H2 of a "progress graph (today)" displayed on the display unit 103 when the plurality of sewing machines 10 and 10A and only date data of a current date (hereinafter referred to as "today") on which a manager performs management work using the production management device 101 are selected on the display screen H1 of the above-described data list table and the display switch W1 of the progress graph is selected.

On the display screen H2, the number of times of sewing today is displayed in the upper part as a bar graph for each of the selected sewing machines 10 and 10A. The number of times of sewing is obtained from the "number of thread cuttings" or the "number of times sewing of a sewing pattern is completed" of the operation data.

In the lower part of the display screen H2, the number of times of sewing today is displayed as a table for the selected sewing machines 10 and 10A.

A setting input field R1 of "today target production number" is displayed in the right upper part of the display screen H2. When a numerical value is input from here, a line LI indicating the today target production number is displayed in the graph in the upper part.

When the operation data of the selected sewing machines 10 includes operation data subjected to the accumulation process illustrated in FIG. 5, "*" is attached to display of the identification sign of the sewing machine on the horizontal axis of the "progress graph (today)" of the display screen H2.

Figure 8:
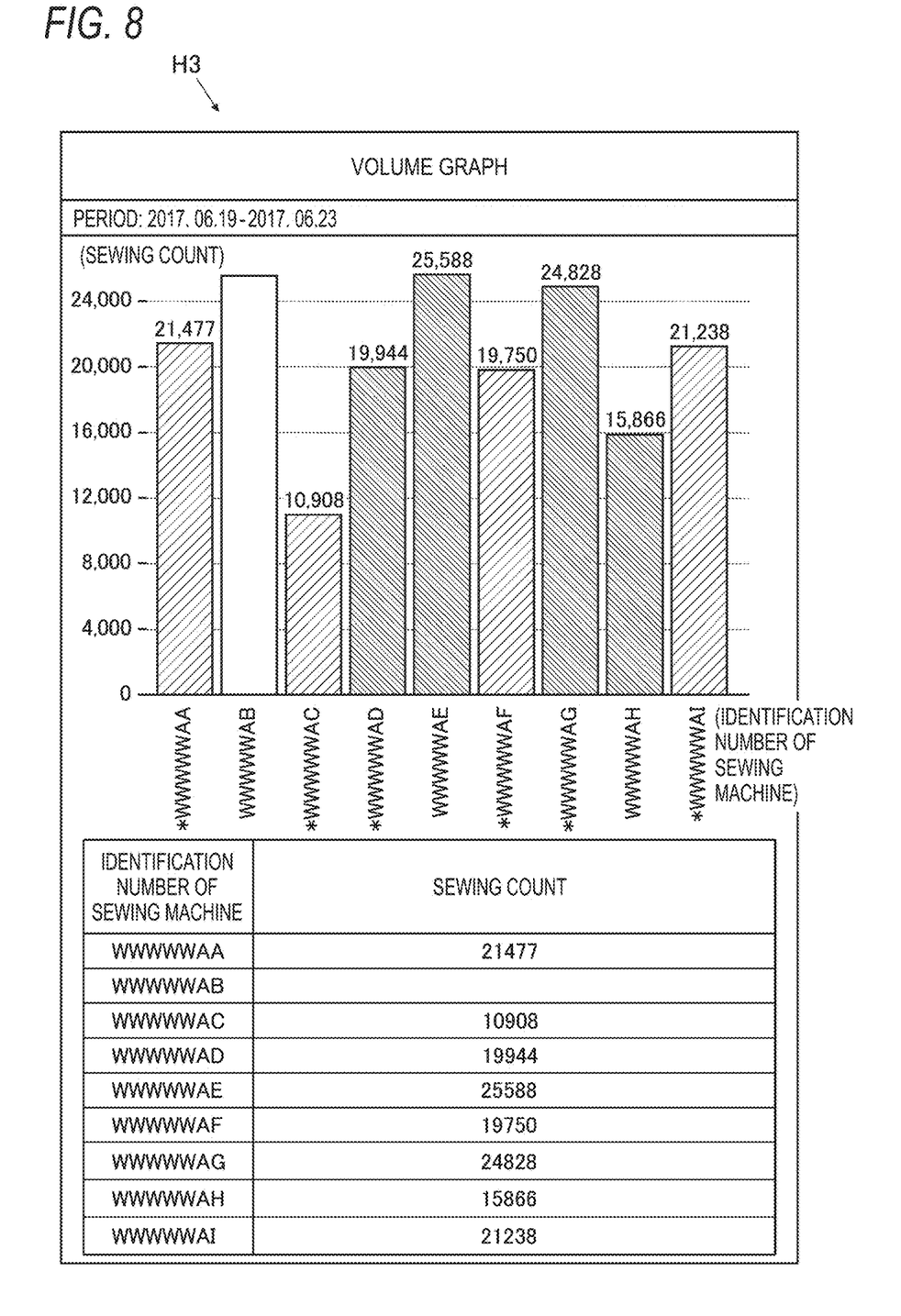
FIG. 8 is a diagram illustrating a display screen of a volume graph.

FIG. 8 illustrates a display screen H3 of a "volume graph" displayed on the display unit 103 when a plurality of sewing machines 10 and 10A and only dates other than today or a plurality of pieces of date data are selected on the display screen H1 of the above-described data list and the display switch W1 of the progress graph is selected.

On the display screen H3, the numbers of times of sewing on all the selected dates are displayed as bar graphs for each of the selected sewing machines 10 and 10A in the upper part. The number of times of sewing is obtained from the "number of thread cuttings" or the "number of times sewing of a sewing pattern is completed" of the operation data.

In the lower part of the display screen H3, the number of times of sewing today is displayed as a table for all the selected sewing machines 10 and 10A.

When there is the operation data included in the operation data subjected to the accumulation process illustrated in FIG. 5 among the operation data of the selected sewing machines 10, "*" is attached to display of the identification sign of the sewing machine on the horizontal axis of the "volume graph" of the display screen H3.

Figure 9:
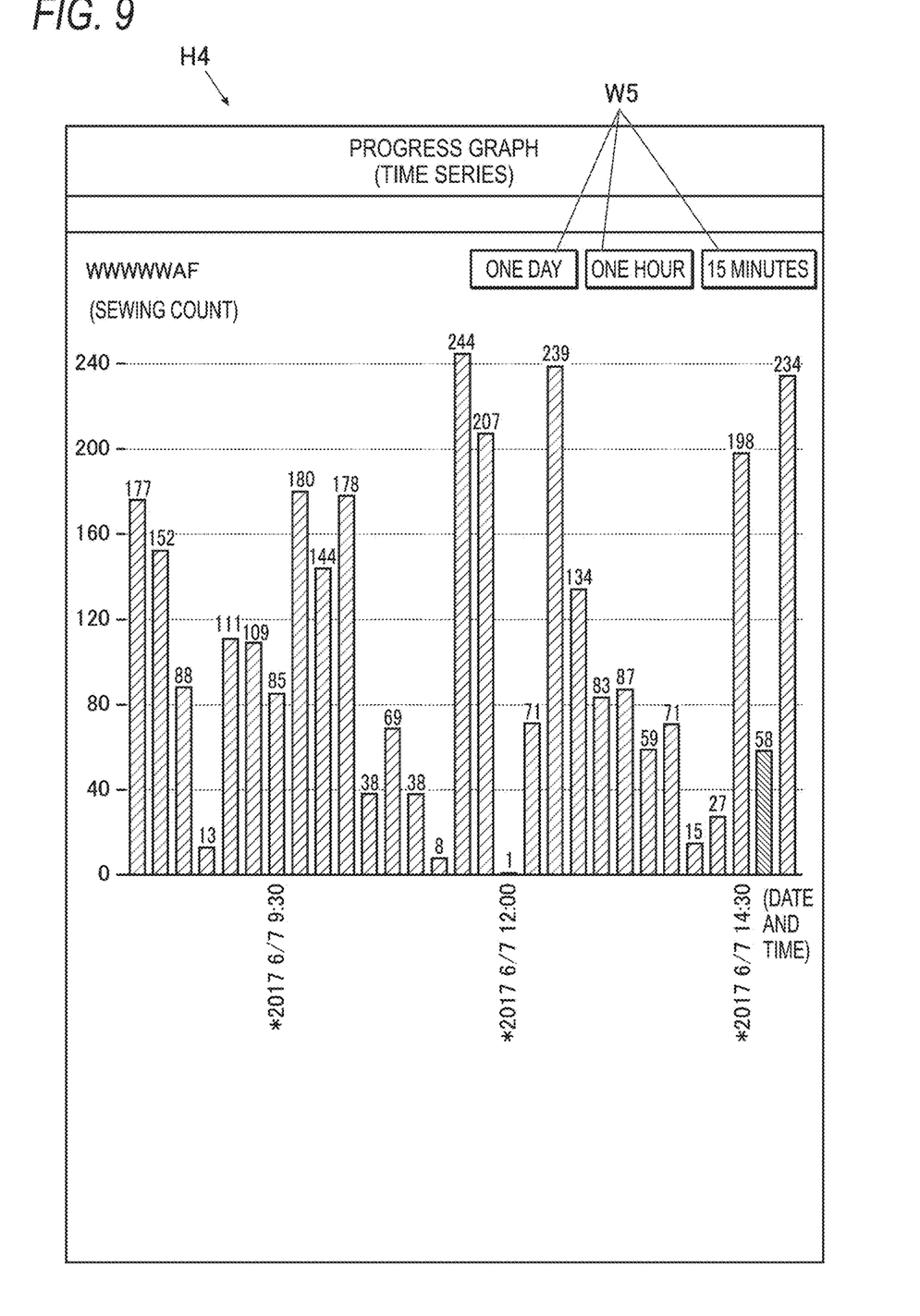
FIG. 9 is a diagram illustrating a display screen of a chronological progress graph.

FIG. 9 illustrates a display screen H4 of a "progress graph (chronological)" displayed on the display unit 103 when one of the bar graphs displayed on the display screen H2 of the "progress graph (today)" or the display screen H3 of the "volume graph" described above is selected.

On the display screen H4, bar graphs of the number of times of sewing in the selected chronological unit are displayed chronologically side by side for the sewing machine 10 or 10A of the selected bar graph. The number of times of sewing is obtained from the "number of thread cuttings" or the "number of times sewing of a sewing pattern is completed" of the operation data like the above-described progress graphs.

The chronological unit of the bar graph can be selected from three units, 15 minutes, 1 hour, and 1 day. In the right upper part of the display screen H4, a selection switch W5 selecting the chronological unit is displayed.

When the operation data of the selected dates of the selected sewing machine 10 includes the operation data subjected to the accumulation process illustrated in FIG. 5, "*" is attached to display of the dates on the horizontal axis of the "volume graph (chronological)" of the display screen H4.

Figure 10:
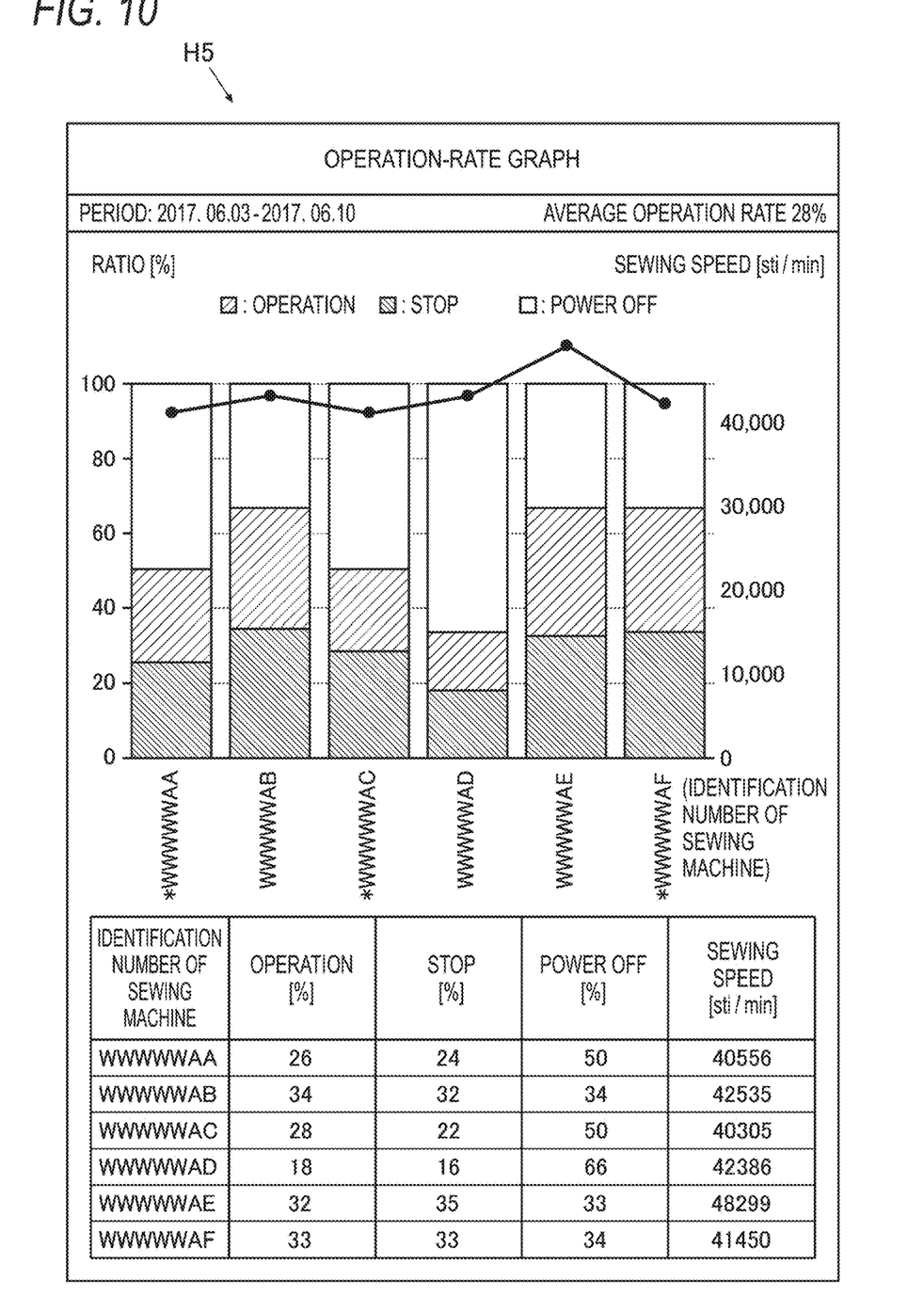
FIG. 10 is a diagram illustrating a display screen of an operation-rate graph.

FIG. 10 illustrates a display screen H5 of an "operation-rate graph" displayed on the display unit 103 when the plurality of sewing machines 10 and 10A and one to a plurality of dates are selected in the above-described data list table and the display switch W2 of the operation-rate graph is selected.

On the display screen H5, bar graphs indicating operation rates of all the selected dates are displayed in the upper part for the selected sewing machines 10 and 10A.

In the bar graph indicating the operation rate, a sum of operation times based on the "rotating time of the sewing machine motor" included in the record data of the operation data, a sum of times in which the sewing machine motor is not rotated during power-on of the main power supply, and a sum of times during power-off of the main power supply are displayed by color.

In the upper part of the display screen H5, average sewing speeds during selection periods of the selected sewing machines 10 and 10A are displayed as a polygonal line graph. The sewing speed is obtained from a value obtained by diving the "rotating time of the sewing machine motor" by the "number of times of sewing" included in the record data of the operation data.

In the lower part of the display screen H5, a ratio of the operation times of the selected sewing machines 10 and 10A, a ratio of the times in which the sewing machine motor is not rotated during power-on of the main power supply, a ratio of the times during power-off of the main power supply, and an average value of the sewing speeds are displayed as a table.

When the operation data of the selected dates of the selected sewing machine 10 includes the operation data subjected to the accumulation process illustrated in FIG. 5, "*" is attached to display of the identification sign of the sewing machine on the horizontal axis of the "operation-rate graph" of the display screen H5.

Figure 11:
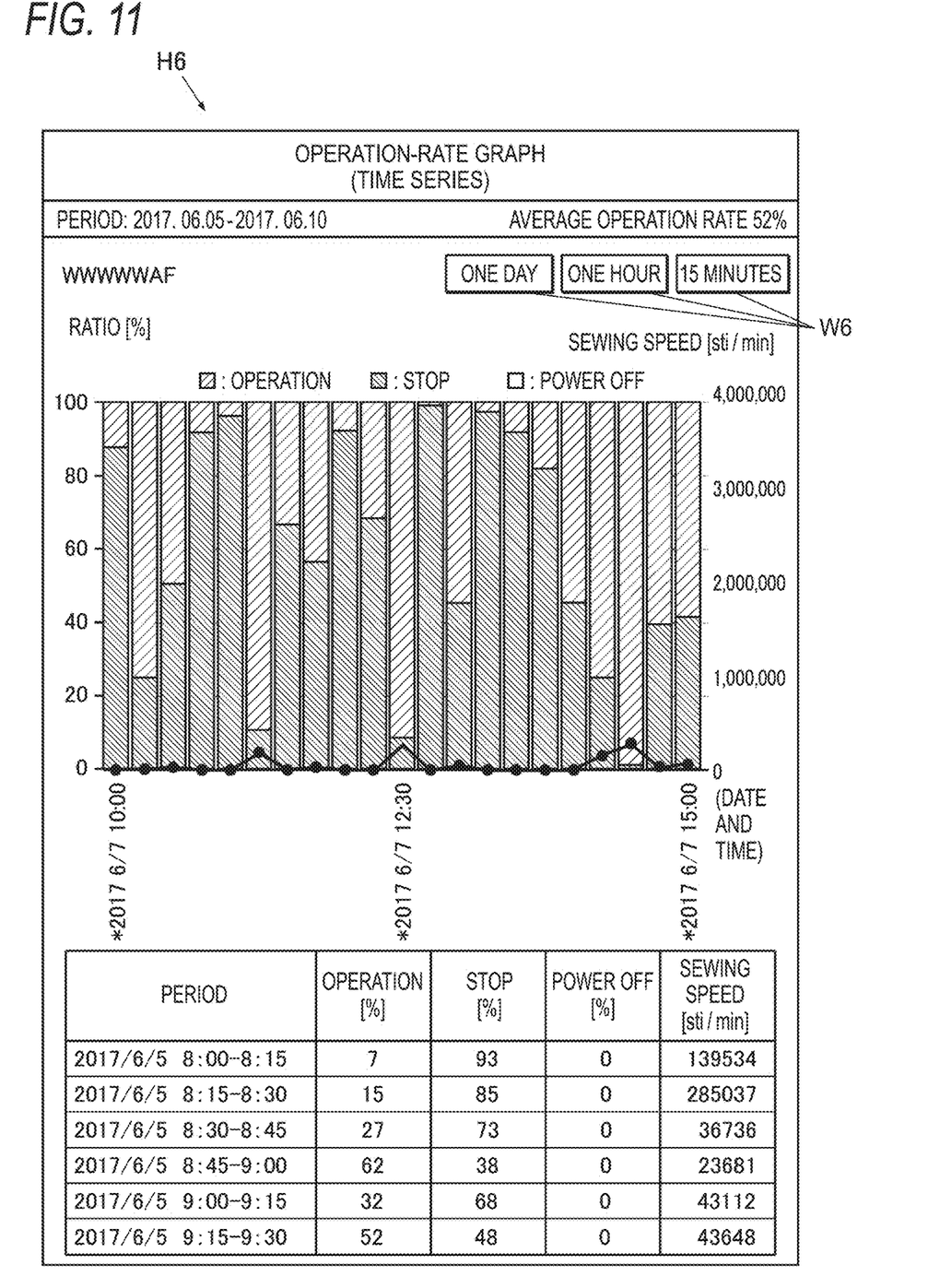
FIG. 11 is a diagram illustrating a display screen of a chronological operation-rate graph.

FIG. 11 illustrates a display screen H6 of an "operation-rate graph (chronological)" displayed on the display unit 103 when one of the bar graphs displayed on the display screen H5 of the above-described "operation-rate graph" is selected.

On the display screen H6, the bar graph of the operation rate in the selected chronological unit is displayed chronologically side by side for the sewing machine 10 or 10A of the selected bar graph.

In the bar graph indicating the operation rate, a sum of operation times in each chronological unit, a sum of times in which the sewing machine motor is not operated during power-on of the main power supply, and a sum of times during power-off of the main power supply are displayed by color.

The chronological unit can be selected from three units, 15 minutes, 1 hour, and 1 day.

In the upper part of the display screen H6, average sewing speeds in each chronological unit during selection periods of the selected sewing machines 10 and 10A are displayed as a polygonal line graph.

In the lower part of the display screen H6, a sum of the operation times in each chronological unit during a selection period of the selected sewing machine 10 or 10A, a sum of the times in which the sewing machine motor is not rotated during power-on of the main power supply, a sum of the times during power-off of the main power supply, and an average sewing value are displayed as a table.

In the right upper part of the display screen H6, a selection switch W6 for selecting the chronological unit is displayed.

When the operation data of the selected dates of the selected sewing machine 10 includes the operation data subjected to the accumulation process illustrated in FIG. 5, "*" is attached to display of the identification sign of the sewing machine on the horizontal axis of the "operation-rate graph (chronological)" of the display screen H6.

[Technical Advantages in Production Management System]

The sewing machine 10 of the production management system 100 includes the CPU 31 functioning as a time acquisition unit that acquires a time at the time of communication from the real time clock 102 of the production management device 101 at the time of the communication with the production management device 101 and grants time information based on the time at the time of the communication to the operation data recorded at the time of the communication.

Accordingly, even when the production management system 100 includes the sewing machine 10 including no real time clock, the time information can be added to the operation data. Thus, production management, a progress, or an operation rate based on the operation information can be compared more accurately and sufficiently.

The production management device 101 includes the CPU 105 functioning as an accumulation processing unit that adds time information indicating a continuation time of a time indicated by time information of operation data stored in advance to newly acquired operation data when the operation data newly acquired from the sewing machine 10 does not include the time information.

Accordingly, even when a frequency of the communication from the production management device 101 to the sewing machine 10 is reduced, the production management, the progress, or the operation rate based on the operation information can be compared more accurately and sufficiently. Thus, it is possible to reduce a burden of collection work of the operation data.

The sewing machine 10 includes the CPU 31 functioning as a first record processing unit that accumulates record data for each first period and generates the operation data, and a second record processing unit that converts the plurality of pieces of record data accumulated for each first period into record data for each second period longer than the first period.

Accordingly, a data amount of the operation data can be reduced and communication between the production management device 101 and the sewing machine 10 can be performed at a high speed.

The communication between the production management device 10 and the sewing machine 10 can be performed using the same short-range wireless communication as NFC, and thus the communication can be performed simply and easily.

The production management device 101 includes the CPU 105 functioning as a display control unit that displays presence or absence of the operation data as a list for each plurality of dates for each of the plurality of sewing machines 10 and 10A based on the operation data acquired from the plurality of sewing machines 10 and 10A.

Accordingly, it is possible to easily ascertain presence or absence of the operation data on the plurality of dates of the plurality of sewing machines 10 and 10A.

Thus, it is possible to more easily ascertain the progress or the operation rate based on the operation information.

The sewing machines 10 and 10A and the production management device 101 transmit and receive the operation data through short-range wireless communication like NFC, it is possible to achieve simplicity of the configuration of the communication device and low cost.

[Others]

The sewing machines 10 and 10A of the production management system 100 are not limited to lockstitch sewing machines or electronic cycle sewing machines. All types of sewing machines may be included.

The production management device 101 is not limited to a table terminal and may be an information processing terminal such as a so-called smartphone or personal computer.

In the communication between the production management device 101 and the sewing machine 10, a short-range wireless communication scheme other than NFC may be adopted or a wireless LAN may be adopted.

DESCRIPTION OF THE REFERENCE NUMERALS 10 sewing machine
31 CPU
100 production management system
101 production management device
102 real time clock
105 CPU

The invention claimed is:

1. A production management system comprising:
   a sewing machine that records chronological operation data; and
   a production management device that communicates with the sewing machine, and acquires and stores the operation data,
   wherein the sewing machine is a sewing machine that does not include a clock for acquiring a current time, and
   wherein the sewing machine includes a time acquisition unit that acquires a time, from a clock of the production management device, at a time of communication with the production management device, and grants time information based on the time at the time of the communication to the operation data recorded at the time of the communication.

2. The production management system according to claim 1, wherein
   the production management device includes an accumulation processing unit that adds time information indicating a continuation time of a time indicated by time information of operation data stored in advance to newly acquired operation data when the operation data newly acquired from the sewing machine does not include the time information.

3. The production management system according to claim 2, wherein the sewing machine includes:
   a first record processing unit that accumulates record data for a first period and generates the operation data, and
   a second record processing unit that converts a plurality of pieces of record data accumulated for the first period into record data for a second period longer than the first period.

4. The production management system according to claim 2, wherein
   the production management device acquires the operation data from a plurality of the sewing machines, and
   the production management system further comprises a display control unit that displays presence or absence of the operation data as a list for a plurality of dates for each of the plurality of sewing machines.

5. The production management system according to claim 4, wherein
   the sewing machine and the production management device transmit and receive the operation data through short-range wireless communication.

6. The production management system according to claim 2, wherein the sewing machine and the production management device transmit and receive the operation data through short-range wireless communication.

7. The production management system according to claim 3, wherein
the production management device acquires the operation data from a plurality of the sewing machines, and
the production management system further comprises a display control unit that displays presence or absence of the operation data as a list for a plurality of dates for each of the plurality of sewing machines.

8. The production management system according to claim 7, wherein
the sewing machine and the production management device transmit and receive the operation data through short-range wireless communication.

9. The production management system according to claim 3, wherein
the sewing machine and the production management device transmit and receive the operation data through short-range wireless communication.

10. The production management system according to claim 1, wherein the sewing machine includes:
a first record processing unit that accumulates record data for a first period and generates the operation data, and
a second record processing unit that converts a plurality of pieces of record data accumulated for the first period into record data for a second period longer than the first period.

11. The production management system according to claim 10, wherein
the production management device acquires the operation data from a plurality of the sewing machines, and
the production management system further comprises a display control unit that displays presence or absence of the operation data as a list for a plurality of dates for each of the plurality of sewing machines.

12. The production management system according to claim 11, wherein
the sewing machine and the production management device transmit and receive the operation data through short-range wireless communication.

13. The production management system according to claim 10, wherein
the sewing machine and the production management device transmit and receive the operation data through short-range wireless communication.

14. The production management system according to claim 1, wherein
the production management device acquires the operation data from a plurality of the sewing machines, and
the production management system further comprises a display control unit that displays presence or absence of the operation data as a list for a plurality of dates for each of the plurality of sewing machines.

15. The production management system according to claim 14, wherein
the sewing machine and the production management device transmit and receive the operation data through short-range wireless communication.

16. The production management system according to claim 1, wherein
the sewing machine and the production management device transmit and receive the operation data through short-range wireless communication.

17. A sewing machine including a memory that stores instructions, and a central processing unit configured to execute the instructions to perform a method including:
recording chronological operation data;
communicating with a production management device that acquires and stores the operation data;
acquiring a time, from a clock of the production management device at a time of communication with the production management device; and
granting time information based on the time at the time of the communication to the operation data recorded at the time of the communication.

18. A production management device including a memory that stores instructions, and a central processing unit configured to execute the instructions to perform a method including:
acquiring operation data from a sewing machine recording chronological operation data; and
adding time information indicating a continuation time of a time indicated by time information of operation data stored in advance to newly acquired operation data when the operation data newly acquired from the sewing machine does not include the time information.

* * * * *